United States Patent [19]

Cheresnowsky et al.

[11] Patent Number: 5,082,637

[45] Date of Patent: Jan. 21, 1992

[54] REMOVAL OF POTASSIUM FROM AMMONIUM MOLYBDATE

[75] Inventors: Michael J. Cheresnowsky; Timothy J. Hoffman, both of Towanda, Pa.

[73] Assignee: GTE Products Corporation, Stamford, Conn.

[21] Appl. No.: 608,447

[22] Filed: Nov. 2, 1990

[51] Int. Cl.$^5$ .............................................. C01G 39/00
[52] U.S. Cl. ........................................ 423/55; 423/53; 423/58; 423/61; 423/606; 423/593
[58] Field of Search ................ 423/593, 606, 55, 53, 423/56, 58, 61

[56] References Cited

U.S. PATENT DOCUMENTS

| | | | |
|---|---|---|---|
| 3,860,419 | 1/1975 | Weber et al. | 423/53 |
| 3,957,946 | 5/1976 | Ronzio et al. | 423/56 |
| 3,988,418 | 10/1976 | Kerfoot et al. | 423/53 |
| 4,612,172 | 9/1986 | Brunelli et al. | 423/56 |
| 4,643,884 | 2/1987 | Cheresnowsky et al. | 423/53 |
| 4,724,128 | 2/1988 | Cheresnowsky et al. | 423/53 |
| 4,933,152 | 6/1990 | Scheftic et al. | 423/56 |

FOREIGN PATENT DOCUMENTS 1147543  3/1967  United Kingdom ................ 423/593

*Primary Examiner*—Michael Lewis
*Assistant Examiner*—Ngoc-Yen M. Nguyen
*Attorney, Agent, or Firm*—James Theodosopoulos

[57] ABSTRACT

Potassium impurity is removed from ammonium molybdate by dissolving the ammonium molybdate in hot acid, allowing the acid solution to cool whereby the ammonium molybdate precipitates out of the solution as molybdenum trioxide and then separating, washing and drying the molybdenum trioxide.

2 Claims, No Drawings

REMOVAL OF POTASSIUM FROM AMMONIUM MOLYBDATE

This invention concerns ammonium dimolybdate. It is particularly concerned with reducing the potassium impurity thereof. In the prior art the potassium content was reduced by acid treating molybdenum oxide to solubilize out the potassium, after which the oxide was converted to the dimolybdate. In U.S. Pat. Nos. 4,612,172, 4,643,884 and 4,933,152 molybdenum trioxide is acid leached to dissolve out potassium. In U.S. Pat. No. 4,724,128, molybdenum dioxide is water washed to remove potassium. In U.S. Pat. No. 3,860,419, 92 to 98% of the potassium is removed by digesting roasted molybdenum concentrates in nitric acid and ammonium nitrate; see column 3, lines 57-58. In U.S. Pat. No. 3,957,946 potassium is removed from molybdenum trioxide in the form of potassium compounds which are susceptible to water leaching; see column 3, line 47 to column 4, line 7.

In this invention, it is the ammonium dimolybdate itself which is treated to remove potassium therefrom. Ammonium dimolybdate is digested in hot acid, after which it is allowed to cool. During cooling the ammonium dimolybdate converts to molybdenum trioxide and precipitates out of the liquid. Unexpectedly, the molybdenum trioxide thus formed has a higher bulk density than the molybdenum trioxide disclosed in the above patents and, therefore, settles faster and filters easier.

EXAMPLE 1

Forty-eight grams of ammonium dimolybdate (ADM) having a potassium impurity content of 700 ppm were dissolved in an acid solution of 43 ml of concentrated nitric acid and 70 ml of water. The ADM was digested for one hour at 75° C. and then allowed to cool. Molybdenum trioxide formed during cooling and precipitated out quickly. The liquid was decanted and the $MoO_3$ layer was washed by adding deionized water and stirring for 30 minutes. The slurry was allowed to settle for 30 minutes and the liquid was decanted. The washing, settling and decanting were repeated a second time after which the $MoO_3$ was dried and analyzed. The potassium content was reduced to 110 ppm which is equivalent to 93 ppm on an ADM basis.

EXAMPLE 2

Ammonium dimolybdate having a potassium impurity content of 35 ppm was treated as in Example 1 above. The potassium content in the $MoO_3$ was less than 10 ppm which is equivalent to less than 10 ppm on an ADM basis.

The molybdenum trioxide produced by this process can be directly used in the synthesis of various molybdenum compounds, as pointed out in U.S. Pat. No. 3,957,946 at column 1, lines 9-15, or it may be converted to the molybdate by dissolving in an ammonia solution, filtering, passing through a chelating cation exchange resin to remove cations and then crystallizing.

This process may also be used to remove potassium from other ammonium molybdates such as ammonium paramolybdate.

We claim:

1. The method of processing ammonium dimolybdate (ADM) crystals containing potassium as an impurity comprising the steps of dissolving the ADM crystals directly in hot acid, allowing the acid solution to cool thereby precipitating molybdenum trioxide out of the solution, and then removing, washing and drying the molybdenum trioxide whereby the potassium content of the molybdenum trioxide is lower than that of said ADM crystals.

2. The method of purifying ADM crystals containing potassium as an impurity comprising the steps of dissolving the ADM crystals in hot nitric acid and digesting the ADM for one hour at 75° C., allowing the acid solution to cool thereby forming and precipitating molybdenum trioxide, decanting the liquid, washing and drying the molybdenum trioxide, whereby the potassium content of the molybdenum trioxide is lower than that of the ADM crystals.

* * * * *